US009830852B2

United States Patent
Kim

(10) Patent No.: US 9,830,852 B2
(45) Date of Patent: Nov. 28, 2017

(54) LIGHT EMITTING DISPLAY APPARATUS, METHOD OF REPAIRING THE SAME AND METHOD OF DRIVING THE SAME

(71) Applicant: SAMSUNG DISPLAY CO., LTD., Yongin, Gyeonggi-Do (KR)

(72) Inventor: Dong-Gyu Kim, Yongin (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 96 days.

(21) Appl. No.: 14/291,505

(22) Filed: May 30, 2014

(65) Prior Publication Data

US 2015/0022513 A1 Jan. 22, 2015

(30) Foreign Application Priority Data

Jul. 17, 2013 (KR) ........................ 10-2013-0084378

(51) Int. Cl.
*G06F 3/038* (2013.01)
*G09G 3/3225* (2016.01)

(52) U.S. Cl.
CPC ........... *G09G 3/3225* (2013.01); *G06F 3/038* (2013.01); *G09G 2300/043* (2013.01); *G09G 2300/0413* (2013.01); *G09G 2300/0426* (2013.01); *G09G 2310/0281* (2013.01); *G09G 2330/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,098,987 | B1 * | 8/2006 | Jen | G02F 1/1309 349/152 |
| 2005/0168491 | A1 * | 8/2005 | Takahara | G09G 3/006 345/690 |
| 2006/0017672 | A1 * | 1/2006 | Aoki | G09G 3/3233 345/77 |
| 2007/0118781 | A1 | 5/2007 | Kim | |
| 2007/0200992 | A1 * | 8/2007 | Kim | G02F 1/1362 349/143 |
| 2007/0234152 | A1 * | 10/2007 | Kwon | G01R 31/28 714/726 |
| 2010/0044691 | A1 | 2/2010 | Hong et al. | |
| 2011/0032442 | A1 * | 2/2011 | Van Aerle | G02F 1/136259 349/38 |
| 2012/0162275 | A1 * | 6/2012 | Park | H01L 27/3262 345/690 |

(Continued)

FOREIGN PATENT DOCUMENTS

JP 2007-316511 A 12/2007
JP 2007316511 A * 12/2007 ............... G09G 3/30

(Continued)

Primary Examiner — Jennifer Mehmood
Assistant Examiner — Sosina Abebe
(74) Attorney, Agent, or Firm — Lee & Morse, P.C.

(57) ABSTRACT

A light emitting display apparatus includes a plurality of emission pixels in an active area, a plurality of dummy pixels in a dummy area; and a plurality of repair lines, each connecting an emission pixel of the emission pixels to a dummy pixel of the dummy pixels, wherein a data signal is simultaneously provided to the emission pixel and the dummy pixel which are connected to the repair line so that the emission pixel emits light.

11 Claims, 15 Drawing Sheets

(56) References Cited

U.S. PATENT DOCUMENTS

2012/0300165 A1\* 11/2012 Zhuang ............. G02F 1/136259
　　　　　　　　　　　　　　　　　　　　　　　349/139
2014/0183481 A1\* 7/2014 Lee .................... H01L 27/3244
　　　　　　　　　　　　　　　　　　　　　　　257/40
2014/0292827 A1 10/2014 Kang et al.

FOREIGN PATENT DOCUMENTS

| KR | 10-0666639 B1 | 1/2007 |
| KR | 10-0666640 B1 | 1/2007 |
| KR | 10-0932989 B1 | 12/2009 |
| KR | 10-2014-0119584 | 10/2014 |

\* cited by examiner

LIGHT EMITTING DISPLAY APPARATUS, METHOD OF REPAIRING THE SAME AND METHOD OF DRIVING THE SAME

CROSS-REFERENCE TO RELATED APPLICATION

Korean Patent Application No. 10-2013-0084378, filed on Jul. 17, 2013, and entitled: "Organic Light Emitting Display Apparatus, Method of Repairing the Same and Method of Driving the Same," is incorporated by reference herein in its entirety.

BACKGROUND

1. Field

One or more embodiments described herein relate to a light emitting display apparatus and associated methods.

2. Description of the Related Art

When a defect occurs in a pixel, the pixel may emit light continuously without regard to a scan signal and a data signal. The continuously emitted light is recognized as a bright (or hot) spot. Attempts have been made overcome this problem. According to one technique, the defective pixel is controlled to be a dark spot. However, the pixel circuitry required to implement this technique is complex.

SUMMARY

In accordance with one embodiment, a display apparatus includes a plurality of emission pixels in an active area, a plurality of dummy pixels in a dummy area, and a plurality of repair lines, each connecting an emission pixel of the emission pixels to a dummy pixel of the dummy pixels, wherein a data signal is simultaneously provided to the emission pixel and the dummy pixel is which are connected to the repair line so that the emission pixel emits light. The at least one dummy area may be adjacent at least one of an above side or below side of the active area.

Each of the emission pixels may include an emission pixel circuit connected to an emission device, wherein each dummy pixel includes a dummy pixel circuit, and the repair line connects the emission device of the emission pixel to the dummy pixel circuit of the dummy pixel at a time when the emission pixel circuit and the emission device are not connected to one another.

The emission pixel circuit may include a first transistor to transfer a data signal in response to a scan signal; a capacitor to store a voltage corresponding to the data signal; and a second transistor to transfer a driving current corresponding to the voltage stored in the capacitor to the emission device. The dummy pixel circuit and emission pixel circuit may have substantially same or different structures.

Each of the emission pixels may include a plurality of sub-emission pixels, wherein each dummy pixel includes a plurality of sub-dummy pixels, and wherein the at least one repair line connects one of the plurality of sub-emission pixels to one of the plurality of sub-dummy pixels.

The emission pixels may be connected to respective scan and data lines, and the at least one dummy pixel is connected to a dummy scan line and a corresponding one of the data lines.

The dummy pixels are provided for a column of emission pixels and the repair lines are provided for the column, and the display apparatus may further include a plurality of dummy scan lines connected to respective ones of the dummy pixel, wherein each dummy scan line is to provide a corresponding one of the dummy pixel circuits with a dummy scan signal when the corresponding one of the dummy pixel circuits is connected to an associated repair line and the scan signal is applied to the emission pixel connected to the associated repair line.

Each emission pixel may have a plurality of sub-emission pixels, each dummy pixel includes a plurality of sub-dummy pixels and the repair line may connect one of the plurality of sub-emission pixels of a defective emission pixel to corresponding ones of the sub-dummy pixels in a same column to each other.

Each emission pixel may be connected to a scan line and a data line, and each dummy pixel is connected to the scan line and a dummy data line. The at least one dummy pixel may be connected to one of a plurality of dummy data lines.

The at least one dummy pixel may be provided for a row of emission pixels, the at least one repair line may be provided for the row, and the display apparatus may further include at least one dummy data line in a column direction in the dummy area, wherein the at least one dummy data line may be connected to the at least one dummy pixel connected to the repair line, the at least one dummy data line may apply a data signal to the dummy pixel, and wherein the data signal may be the data signal provided to the emission pixel connected to the repair line.

The emission pixel may include a plurality of sub-emission pixels, each dummy pixel may include a plurality of sub-dummy pixels, and the at least one repair line may connect one of the plurality of sub-emission pixels of a defective emission pixel and one of the plurality of sub-dummy pixels in a same row to each other. The dummy area may be disposed on at least one of a left side or a right side of the active area.

In accordance with another embodiment, a method for driving a display apparatus includes applying data signals to a plurality of emission pixels, applying a data signal to a dummy pixel connected to a repair line when one of the data signals is provided to the emission pixel connected to the repair line, wherein the data signal applied to the dummy pixel is the data signal provided to the emission pixel, and emitting light from the plurality of emission pixels according to driving currents corresponding to respective ones of the data signals.

The method may include applying scan signals sequentially to the plurality of emission pixels, applying a dummy scan signal to the dummy pixel connected to the repair line when the scan signal is applied to the emission pixel connected to the repair line, and applying the data signals to the emission pixels in synchronization with the scan signals and the dummy scan signal.

The method may include applying scan signals sequentially to the plurality of emission pixels, applying the data signals to the emission pixels in synchronization with the scan signals, and applying the data signal provided to the emission pixel connected to the repair line to the dummy pixel connected to the repair line.

In accordance with another embodiment, a method of repairing an organic light emitting display apparatus includes breaking a connection between an emission device and an emission pixel circuit corresponding to a defective pixel, connecting the emission device of the defective pixel to a repair line, and connecting a dummy pixel circuit of a dummy pixel to the repair line, wherein the dummy pixel circuit supplies a data signal to the emission pixel and wherein a driving current corresponding to the data signal is provided to the emission device of the defective pixel via the repair line.

The dummy pixel may be connected to the repair line formed in a same column as the emission pixel connected to the repair line. Additionally, or alternatively, the dummy pixel may be connected to the repair line is formed in a same row as the emission pixel connected to the repair line, and the method further include connecting the dummy pixel circuit of the dummy pixel to a dummy data line, the dummy data line carrying the data signal applied to the emission pixel.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
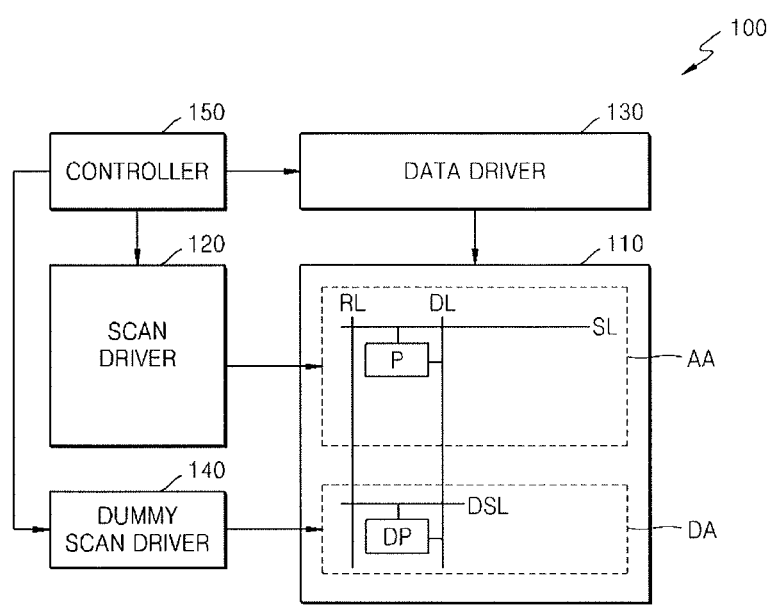
FIG. 1 illustrates an embodiment of a display apparatus.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates an embodiment of a display apparatus 100 which includes a display panel 110, a scan driver 120, a data driver 130, a dummy scan driver 140, and a controller 150. The scan driver 120, the data driver 130, the dummy scan driver 140, and the controller 150 may be formed on separate semiconductor chips, or may be integrated on one semiconductor chip. In addition, the scan driver 120 may be formed on the same substrate as the display panel 110, but not necessarily so.

The display panel 110 includes a dummy area DA adjacent to an active area AA. The dummy area DA may be formed on at least one of above or below active area AA. A plurality of emission pixels P connected to scan lines SL and data lines DL are arranged on the active area AA. At least one dummy pixel DP connected to a dummy scan line DSL and a data line DL is arranged on the dummy area DA. The display panel 110 may also include one or more repair lines RL. The repair lines may be parallel to the data lines DL as shown, or may be oriented in a different direction.

The scan driver 120 generates and sequentially supplies scan signals to the emission pixels P via a plurality of scan lines SL.

The data driver 130 sequentially supplies data signals to the emission pixels P via a plurality of data lines DL. The data driver 130 converts input image data DATA having gray scale values input from the controller 150 into data signals in the form of voltage or current.

The dummy scan driver 140 generates and supplies dummy scan signal(s) to the dummy pixel(s) DP via the dummy scan line(s) DSL. The dummy scan driver 140 may supply a dummy scan signal to each dummy scan line DSL connected to each dummy pixel DP. When an emission pixel P and a dummy pixel P are connected to a repair line RL of the same column, the dummy scan driver 140 applies a dummy scan signal to the dummy pixel DP at a time when the scan signal is applied to the emission pixel P. Accordingly, the same data signal may be simultaneously applied to the emission pixel P and the dummy pixel DP connected to the repair line RL, so that the emission pixel P connected to the repair line RL emits light.

The dummy scan driver 140 may be formed on an external flexible printed circuit board (PCB), and may apply the dummy scan signal using an out lead bonding (OLB) pad for a chip on film (COF), which is connected to the dummy scan lines DSL.

The controller 150 generates and transfers scan control signals and data control signals to the scan driver 120 and the data driver 130. Accordingly, the scan driver 120 sequentially applies the scan signals to the scan lines SL, and the data driver 130 applies the data signal to each of the pixels P. Also, the controller 150 generates a dummy scan control signal for controlling a time point when the dummy scan signal is applied. The controller 150 transfers the dummy scan control signal to the dummy scan driver 140.

The dummy scan driver 140 applies the dummy scan signal to the dummy scan line DSL of the dummy pixel DP that is used in repairing. The dummy pixel DP may receive a data signal that is the same as the data signal applied to the pixel P that is repaired from the data driver 130. A first power voltage ELVDD, a second power voltage ELVSS, an emission control signal EM, and an initializing voltage Vint may be applied to each of the pixels P under a control of the controller 150.

Figure 2:
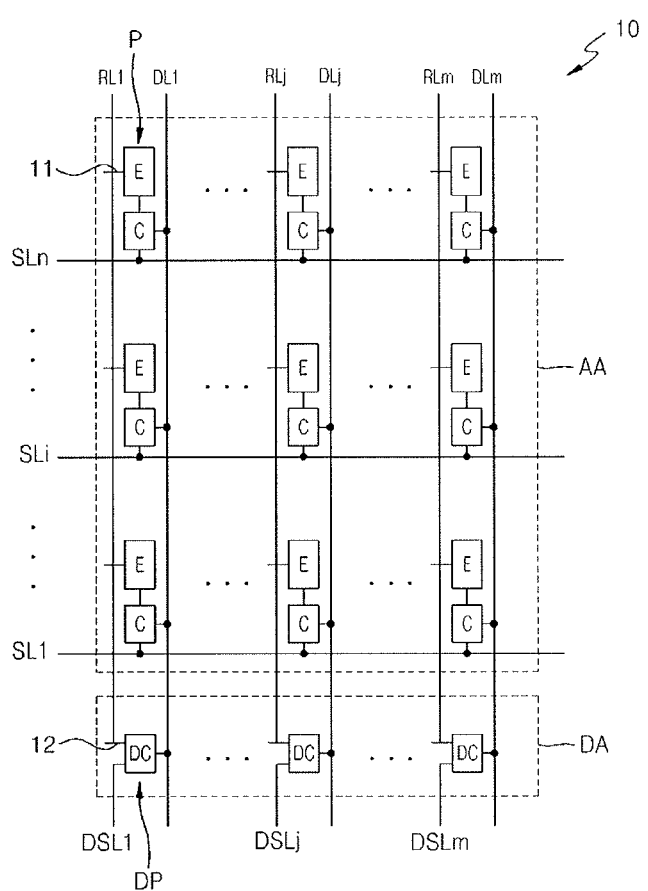
FIG. 2 illustrates an example of a display panel in FIG. 1.

FIG. 2 illustrates an example of the display panel 10 in FIG. 1. Referring to FIG. 2, the display panel 10 includes an active area AA for displaying images by emitting light and a dummy area DA adjacent the active area AA.

The active area AA includes a plurality of scan lines SL1 through SLn and a plurality of data lines DL1 through DLm. A plurality of emission pixels P are formed where the scan lines SL1 through SLn and the data lines DL1 through DLm cross each other in a roughly matrix shape. Each of the emission pixels P includes a emission pixel circuit C and an emission device E. The emission device E receives a driving current from the emission pixel circuit C to emit light. The emission pixel circuit C may include one or more thin film transistors (TFTs) and capacitors. The emission pixel P may emit light of a color, for example, one of red, blue, green, and white. In other embodiments, the emission pixel P may emit color different from red, blue, green, and white.

A plurality of repair lines RL1 through RLm extend parallel with and spaced from data lines DL1 through DLm. The emission device E in each emission pixel P may be insulated from the repair line RL in the same column, and may be electrically connected to the repair line RL as a result of a repairing operation.

For example, emission device E may be electrically connected to a first connection member 11. The first connection member 11 may partially overlap repair line RL with an insulating layer therebetween. The first connection member 11 may include one or more conductive layers. When a repairing operation is performed, a laser beam is irradiated to an overlapping region between the first connection member 11 and the repair line RL. Then, the insulating layer is damaged and the first connection member 11 and the repair line RL are shorted to be electrically connected to each other. Accordingly, the emission device E may be electrically connected to the repair line RL.

The dummy area DA may be formed above and/or below the active area AA. One or more dummy pixels DP may be formed in each column of pixels. In FIG. 2, the dummy area DA is formed below the active area AA, and one dummy pixel DP is formed in each pixel column.

A plurality of dummy scan lines DSL1 through DSLm and the plurality of data lines DL1 through DLm are arranged on the dummy area DA. The dummy pixels DP are connected to the dummy scan lines DSL1 through DSLm and the data lines DL1 through DLm. The dummy scan lines DSL1 through DSLm are separately formed on the columns, and respectively connected to the dummy pixels DP. The repair lines RL1 through RLm of the active area AA and the data lines DL1 through DLm are extended in columns. That is, the dummy pixel DP and the emission pixels P of the same column share the same data line DL and the repair line RL.

The dummy pixel DP does not include an emission device, but rather includes a dummy pixel circuit DC. The dummy pixel circuits DC may be the same as or different from the emission pixel circuits C. For example, the transistor and/or capacitor of the emission pixel circuit C may be omitted and/or added in the dummy pixel circuit DC. Alternatively, sizes and characteristics of the transistor and capacitor in the dummy pixel circuit DC may be different from those of the emission pixel circuit C.

The dummy pixel circuit DC is insulated from the repair line RL at the same column. The dummy pixel circuit DC is electrically connected to the repair line RL when a repairing operation is performed. For example, the dummy pixel circuit DC is electrically connected to a second connection member 12. The second connection member 12 may partially overlap a corresponding repair line RL with an insulating layer therebetween.

The second connection member 12 may include one or more conductive layers similar to the first connection member 11. When a repairing operation is performed, a laser beam is irradiated onto the overlapping region between the second connection member 12 and the repair line RL. Then, the insulating layer is damaged and the second connection member 12 and the repair line RL are shorted and electrically connected to each other. Accordingly, the dummy pixel circuit DC is electrically connected to the repair line RL.

Figure 3:
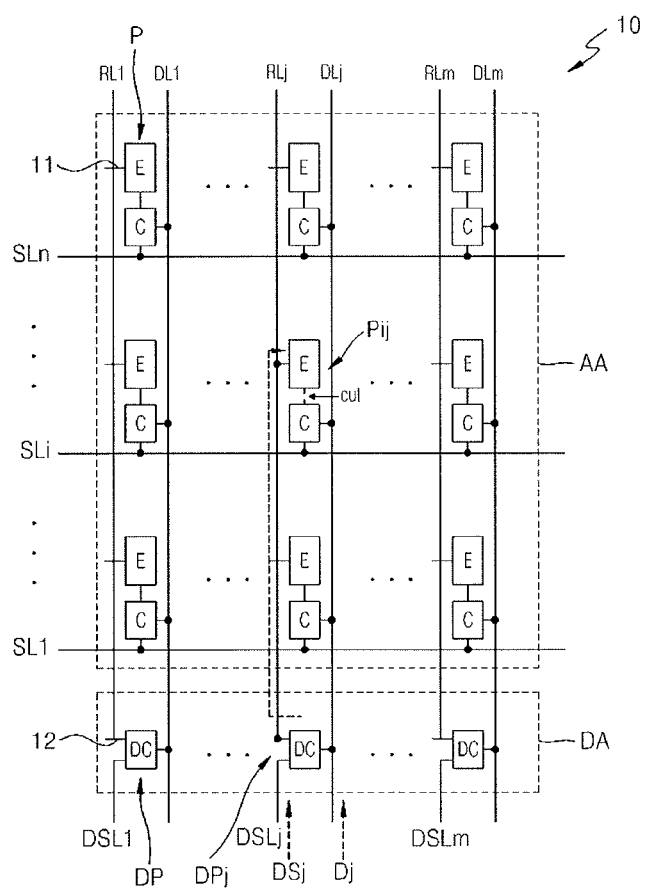
FIG. 3 illustrates a method for repairing a defective pixel using a repair line in the display panel of FIG. 2.
Figure 4:
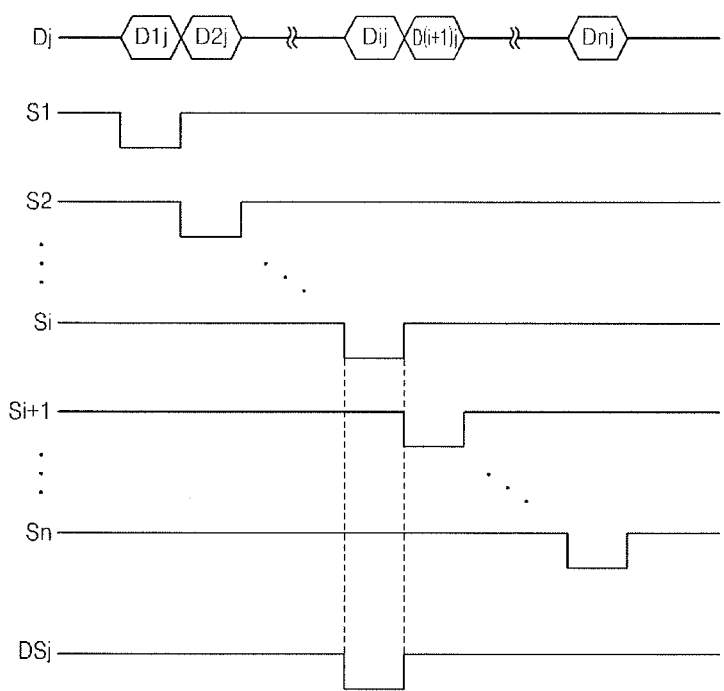
FIG. 4 illustrates scan and data signals supplied to the repaired panel of FIG. 3.

FIG. 3 illustrates an embodiment of a method of repairing a defective pixel using repair line RL in the display panel 10 of FIG. 2. FIG. 4 is a timing diagram including scan and data signals supplied to the repaired display panel in FIG. 3. A case will be considered where a emission pixel Pij connected to an i-th scan line SLi and a j-th data line DLj is assumed to be defective from among emission pixels P in active area AA. For example, emission pixel circuit C of the emission pixel Pij will be considered to be defective in this example.

Referring to FIG. 2, the emission device E of the defective emission pixel Pij is isolated from the emission pixel circuit C. For example, laser is irradiated to the connecting portion between the emission device E and the emission pixel circuit C to cut the connecting portion. Thus, emission device E of the emission pixel Pij may be isolated from emission pixel circuit C.

Next, emission device E of the emission pixel Pij and the dummy pixel circuit DC of a dummy pixel DPj are connected to the repair line RLj at the same column. For example, the laser is irradiated onto the overlapping portion between the first connection member 11 connected to the emission device E of the emission pixel Pij and the repair line RLj. As a result, the first connection member 11 and the emission device E are electrically connected to the repair line RLj of a j-th column. In addition, the laser is irradiated onto the overlapping region between the second connection member 12 that is connected to the dummy pixel circuit DC of the dummy pixel DPj of the same column (j-th column) and the repair line RLj. As a result, the second connection member 12 and the dummy pixel circuit DC are electrically connected to the repair line RLj. As such, the emission device E of the emission pixel Pij and the dummy pixel circuit DC of the dummy pixel DPj may be electrically connected to the repair line RLj.

Referring to FIG. 4, scan signals S1 through Sn are sequentially provided to first through n-th scan lines SL1 through SLn. Data signals D1 through Dm are sequentially provided to first through m-th data lines DL1 through DLm in synchronization with the scan signals S1 through Sn. In FIG. 4, a data signal Dj provided to a j-th column is shown. In addition, a dummy scan signal DSj is provided to the dummy scan line DSLj that is connected to a dummy pixel DPj at the same time when the scan signal Si is provided to the repaired emission pixel Pij. The data signal Dij, that is the same as the data signal Dij provided to the repaired emission pixel Pij, is applied to the dummy pixel DPj in synchronization with the dummy scan signal DSj. Accordingly, the emission device E of the defective emission pixel Pij may receive current corresponding to the data signal Dij from the dummy pixel circuit DC of the dummy pixel DPj via the repair line RLj, to thereby emit light.

In one embodiment, a width of the scan signal may be provided as one horizontal period (1H) in FIG. 4. In another embodiment, a width of a scan signal may be provided as two horizontal periods (2H). The widths of adjacent scan signals, for example, widths of the first scan signal S1 and second scan signal S2, may be provided to overlap by 1H or less. Accordingly, a lack of charges due to a resistive-capacitive (RC) delay of signal lines according to a large-sized active area AA may be solved.

Figure 5:
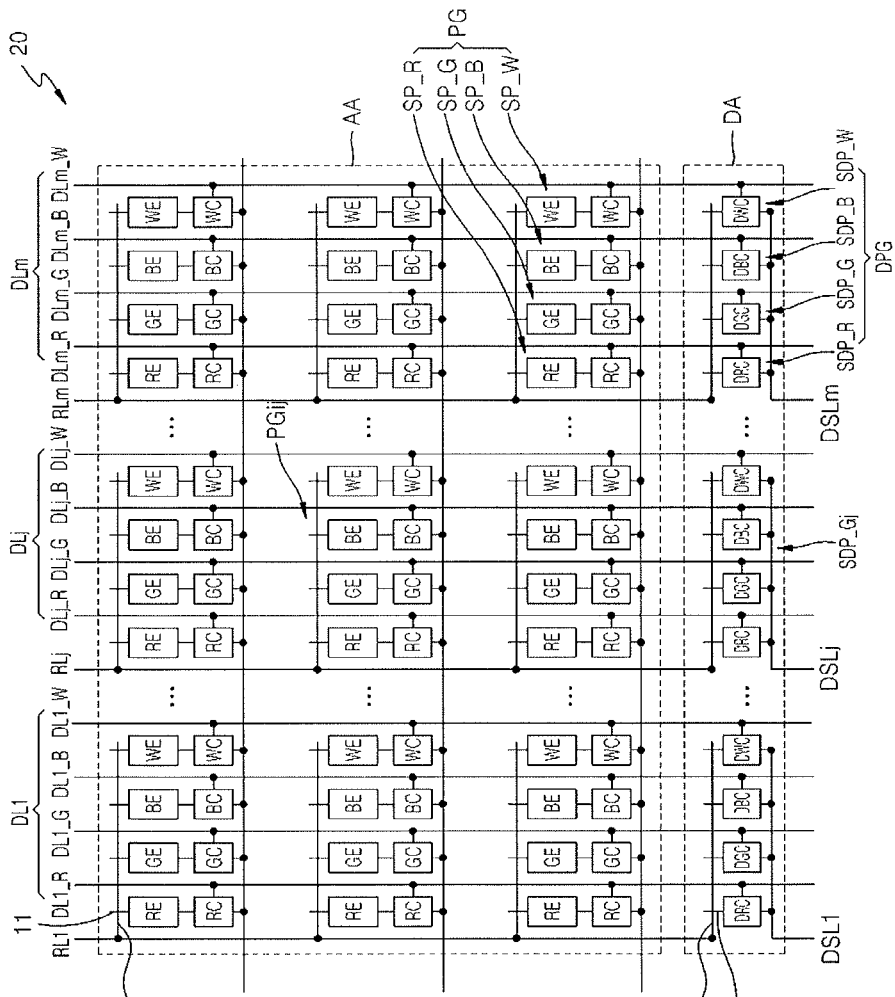
FIG. 5 illustrates another example of the display panel in FIG. 1.

FIG. 5 illustrates another example of the display panel shown in FIG. 1. Referring to FIG. 5, the display panel 20 includes active area AA displaying images by emitting light and dummy area DA adjacent the active area AA.

The active area AA includes a plurality of scan lines SL1 through SLn and a plurality of data lines DL1 through DLm. A plurality of unit emission pixels PG are formed where the scan lines SL1 through SLn and the data lines DL1 through DLm cross each other in roughly a matrix shape. Each of the unit emission pixels PG may include a plurality of sub-emission pixels SP. For example, the unit emission pixel PG may include a red sub-emission pixel SP_R, a green sub-emission pixel SP_G, a blue sub-emission pixel SP_B, and a white sub-emission pixel SP_W.

The plurality of sub-emission pixels SP in the unit emission pixel PG may be connected to a same scan line SL. The sub-emission pixels may also be respectively connected to data lines DL_R, DL_G, DL_B, and DL_W. For example, the sub-emission pixels SP_R, SP_G, SP_B, and SP_W of the unit emission pixel PGij located between the i-th row and the j-th column are connected to an i-th scan line SLi. These sub-emission pixels may also be respectively connected to data lines DLj_R, DLj_G, DLj_B, and DLj_W in the j-th column.

Also, as illustrated in FIG. 5, the red sub-emission pixel SP_R, the green sub-emission pixel SP_G, the blue sub-emission pixel SP_B, and the white sub-emission pixel SP_W may respectively include emission pixel circuits RC, GC, BC, and WC and emission devices RE, GE, BE, and WE. The emission devices RE, GE, BE, and WE emit light based on driving currents received from the emission pixel circuits RC, GC, BC, and WC, respectively. Each of the emission pixel circuits RC, GC, BC, and WC may include one or more TFTs and capacitors.

A plurality of repair lines RL1 through RLm, extend parallel to and spaced from the data lines DL1 through DLm. The emission devices RE, GE, BE, and WE in the unit emission pixel PG are insulated from a corresponding repair line RL in the same column, and may be electrically connected to repair line RL when a repairing operation is performed. For example, emission devices RE, GE, BE, and WE in the unit emission pixel PG are electrically connected to the first connection members 11. The first connection members 11 may partially overlap third connection members 33, that are electrically connected to repair line RL, with insulating layers therebetween. The third connection member 33 may include one or more conductive layers similar to the first connection member 11.

When the repairing operation is performed, a laser is irradiated onto the overlapping region between the first and third connection members 11 and 33. Then, the insulating layer is damaged and the first and third connection members 11 and 33 are shorted to thereby become electrically connected to each other. Accordingly, emission devices RE, GE, BE, and WE may be electrically connected to corresponding repair lines RL.

A plurality of dummy scan lines DSL1 through DSLm and the plurality of data lines DL1 through DLm are arranged on the dummy area DA. A plurality of unit dummy pixels DPG are connected the dummy scan lines DSL1 through DSLm and the data lines DL1 through DLm. The unit dummy pixels DPG may be formed on at least one of above or below active area AA. One or more unit dummy pixels DPG may be formed in each column. In FIG. 5, dummy area DA is formed below active area AA, and one unit dummy pixel DPG is formed in each of the columns.

Each of the dummy scan lines DSL1 through DSLm is formed in and connected to corresponding ones of the unit dummy pixel DPGs in each column. The dummy scan lines DSL1 through DSLm may be formed in a direction in which the scan lines SL1 through SLn are formed or in a direction in which the data lines DL1 through DLm are formed. The repair lines RL1 through RLm and data lines DL1 through DLm extend from the active area AA.

The unit dummy pixel DPG may include a plurality of sub-dummy pixels SDP. For example, the unit dummy pixel DPG may include a red sub-dummy pixel SDP_R, a green sub-dummy pixel SDP_G, a blue sub-dummy pixel SDP_B, and a white sub-dummy pixel SDP_W. The plurality of sub-dummy pixels SDP_R, SDP_G, SDP_B, and SDP_W are connected to a corresponding dummy scan line DSL, and may be respectively connected to the data lines DL_R, DL_G, DL_B, and DL_W. For example, the sub-dummy pixels SDP_R, SDP_G, SDP_B, and SDP_W in the unit dummy pixel DPG of the j-th column are connected to a j-th dummy scan line DSLj, and may be connected respectively to the data lines DLj_R, DLj_G, DLj_B, and DLj_W of the j-th column.

The plurality of sub-dummy pixels SDP_R, SDP_G, SDP_B, and SDP_W may not include emission devices, but rather include dummy pixel circuits DRC, DGC, DBC, and DWC. Each of the dummy pixel circuits DRC, DGC, DBC, and DWC may include one or more TFTs and capacitors. The dummy pixel circuits DRC, DGC, DBC, and DWC may be the same as or different from the emission pixel circuit C. For example, the transistor and/or the capacitor of the pixel circuits RC, GC, BC, and WC may be omitted and/or added in the dummy pixel circuit DRC, DGC, DBC, or DWC. Additionally, or alternatively, sizes and characteristics of the transistor and, or the capacitor in the dummy pixel circuit DRC, DGC, DBC, or DWC may be different from those of the emission pixel circuits RC, GC, BC, and WC.

The repair lines RL1 through RLm and data lines DL1 through DLm of active area AA extend to the dummy area DA. That is, the unit dummy pixel DPG and the unit emission pixel PG of the same column share the data line DL and the repair line RL.

The dummy pixel circuits DRC, DGC, DBC, and DWC in the unit dummy pixel DPG are insulated from the repair line RL, and may be electrically connected to the repair line RL when a repairing operation is performed. For example, the dummy pixel circuits DRC, DGC, DBC, and DWC in the unit dummy pixel DPG are electrically connected to the second connection members 12. The second connection members 12 may partially overlap a fourth connection member 34 that is electrically connected to the repair line RL, with an insulating layer therebetween. The fourth connection member 34 may include one or more conductive layers similar to the first connection member 11. When a repairing operation is performed, a laser is irradiated onto the overlapping region between each of the second connection members 12 and the fourth connection member 34. Then, the insulating layer is damaged and the second connection member 12 and the fourth connection member 34 are shorted to thereby become electrically connected to each other. Accordingly, the dummy pixel circuits DRC, DGC, DBC, and DWC are electrically connected to the repair line RL.

The foregoing embodiment, in FIG. 5, is an example where the unit pixel includes four sub-pixels for RGBW. However, in other embodiments, the sub-pixels may emit one or more different colors, or a different number of sub-pixels may be included. For example, each unit pixel may include two or more sub-pixels emitting different colors. In one particular example embodiment, each unit pixel may have three sub-pixels for emitting red, green, and blue colors, respectively.

Figure 6:
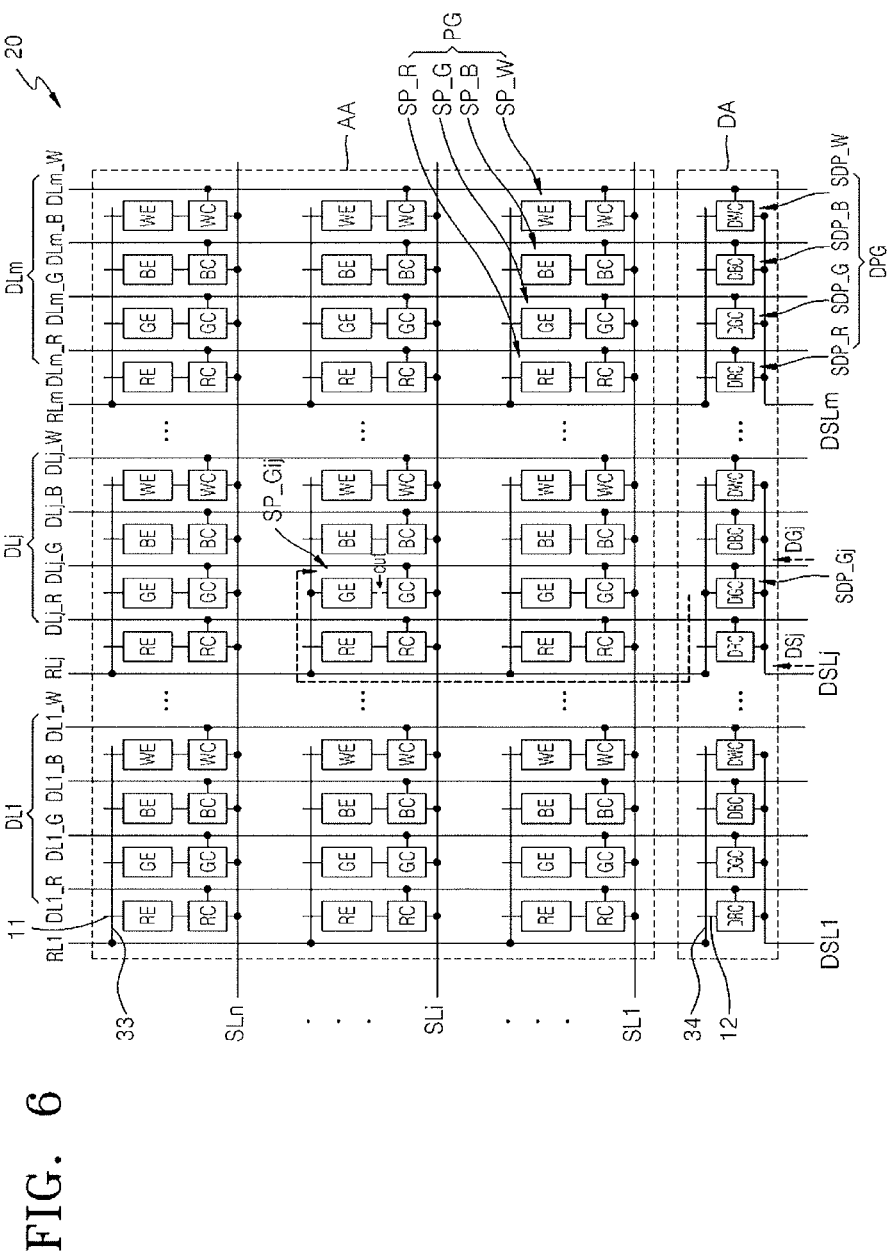
FIG. 6 illustrates a method of repairing a defective pixel using a repair line in the display panel of FIG. 5.
Figure 7:
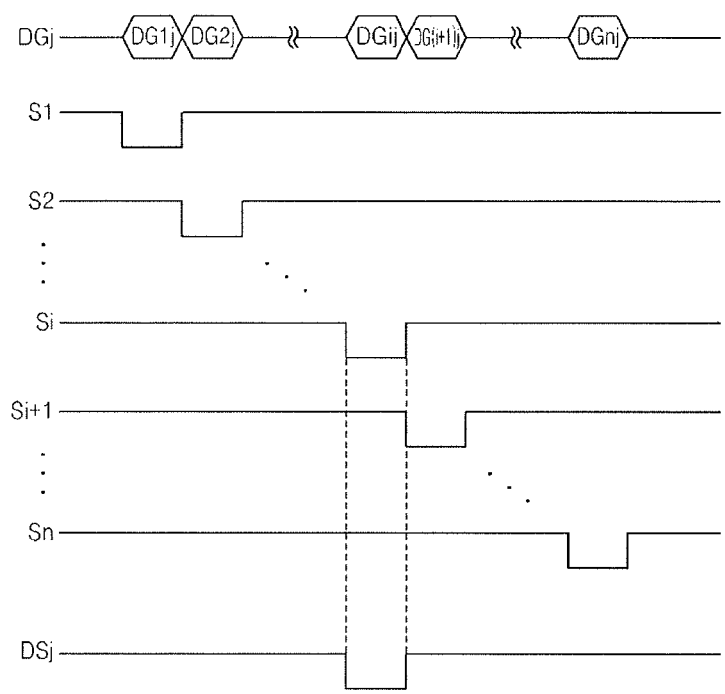
FIG. 7 illustrates scan and data signals supplied to the repaired panel of FIG. 6.

FIG. 6 illustrates a method of repairing a defective pixel using the repair line RL in the display panel 20 of FIG. 5. FIG. 7 illustrates a timing diagram showing scan and data signals provided to the repaired display panel in FIG. 6. For illustrative purposes, in this embodiment a green sub-emission pixel SP_Gij is connected to an i-th scan line SLi, and a j-th data line DLj_G is considered to be defective from among the sub-emission pixels SP in active area AA. More specifically, the emission pixel circuit GC of the green sub-emission pixel SP_Gij is defective.

Referring to FIG. 6, the emission device GE of the green sub-emission pixel SP_Gij that is defective is isolated from the emission pixel circuit GC. For example, a laser is irradiated onto the connection region between the emission device GE and the emission pixel circuit GC to cut the connection region. Thus, the emission device GE of the green sub-emission pixel SP_Gij may be isolated from the emission pixel circuit GC.

Next, the emission device GE of the green sub-emission pixel SP_Gij and the dummy pixel circuit DC of the dummy pixel DPj are connected to the repair line RLj of the same column. For example, a laser is irradiated onto the overlapping region between the first connection member 11 connected to the emission device GE of the green sub-emission pixel SP_Gij and the third connection member 33. As a result, the first and third connection members 11 and 33 are electrically connected to each other.

In addition, the laser is irradiated onto the overlapping region between the second connection member 12 connected to the dummy pixel circuit DGC of the green sub-dummy pixel SDP_Gj in the same column (j-th column) and the fourth connection member 34. As a result, the second and fourth connection members 12 and 34 are electrically connected to each other. As such, the emission device GE of the green sub-emission pixel SP_Gij and the dummy pixel circuit DGC of the green sub-dummy pixel SDP_Gj may be electrically connected to the repair line RLj.

Referring to FIG. 7, scan signals S1 through Sn are sequentially provided to first through n-th scan lines SL1 through SLn. In addition, data signals D1 through Dm are sequentially provided to first through m-th data lines DL1 through DLm in synchronization with the scan signals S1 through Sn.

Also, FIG. 7 shows a green data signal DGj in a j-th column. A dummy scan signal DSj is provided to dummy scan line DSLj that is connected to the green sub-dummy pixel SDP_Gj at the same time when the scan signal Si is provided to the repaired green sub-emission pixel SP_Gij. The data signal DGij, that is the same as the data signal DGij provided to the repaired green sub-dummy pixel SDP_Gj, is applied to the green sub-dummy pixel SDP_Gj in synchronization with the dummy scan signal DSj. Accordingly, the emission device GE of the defective green sub-emission pixel SP_Gij may receive current, corresponding to the data signal DGij from the dummy pixel circuit DGC of the green sub-dummy pixel SDP_Gj, via the repair line RLj, to thereby emit light.

Although a width of the scan signal may be provided as one horizontal period (1H) in FIG. 7, a width of a scan signal may be provided as two horizontal periods (2H) in other embodiments. Also, widths of adjacent scan signals, for example, widths of the first scan signal S1 and the second scan signal S2, may be provided to overlap by 1H or less. Accordingly, a lack of charges due to a resistive-capacitive (RC) delay of signal lines for a large-sized active area AA may be solved.

Figure 8:
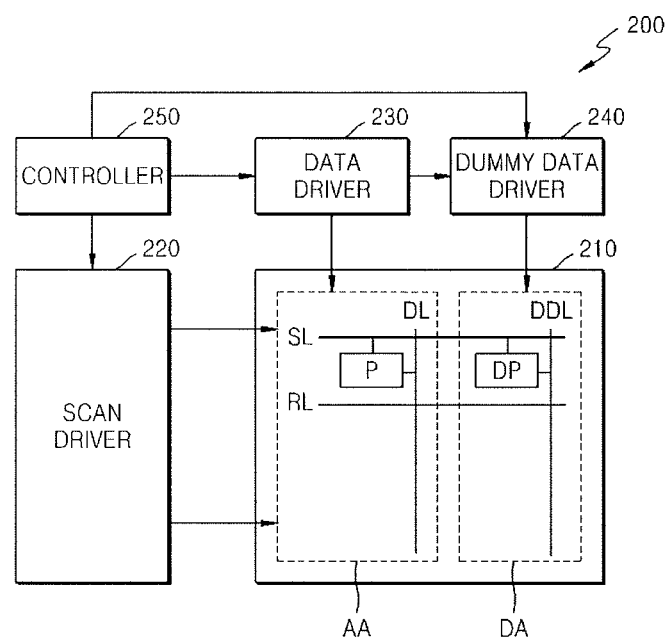
FIG. 8 illustrates another embodiment of a display apparatus.

FIG. 8 illustrates another embodiment of a display apparatus 200 which includes a display panel 210, a scan driver 220, a data driver 230, a dummy data driver 240, and a controller 250. The scan driver 220, the data driver 230, the dummy data driver 240, and the controller 250 may be formed on separate semiconductor chips, or may be integrated on one semiconductor chip. In addition, the scan driver 220 may be formed at the same substrate as that of the display panel 210.

The display panel 210 includes a dummy area DA adjacent active area AA. The dummy area DA may be formed on at least one of left or right positions, or both sides, of active area AA. A plurality of emission pixels P connected to scan lines SL and data lines DL are arranged on active area AA. One or more dummy pixels DP connected to the scan lines SL and dummy data lines DDL are arranged on the dummy area DA. The display panel 210 may include repair lines RL are arranged in parallel with the scan lines SL. As is the case with the repair lines and scan lines in the previous embodiments, the repair lines in the present embodiment do not have to be parallel to the data lines.

The scan driver 220 may generate and sequentially supply scan signals to the emission pixels P via the plurality of scan lines SL.

The data driver 230 may provide the emission pixels P with the data signals sequentially via the plurality of data lines DL. The data driver 230 converts image data ATA having a gray scale value, input from controller 250, into a voltage-type or current-type data signal.

The dummy data driver 240 may generate and supply data signals to the dummy pixel DP via the dummy data lines DDL. In a case where the emission pixel P and the dummy pixel DP are connected to the same repair line RL, the emission pixel P and the dummy pixel DP may receive the same scan signal. The dummy data driver 240 may apply a data signal to the dummy pixel DP that is the same as the data signal applied to the emission pixel P.

The dummy data driver 240 is formed on an external flexible PCB, and may apply data signals using an OLB pad for a COF, which is connected to the dummy data lines DDL. The dummy data driver 240 may receive the data signals to be provided to the dummy pixel DP from the data driver 230.

The controller 250 generates and supplies scan and data control signals, respectively, to scan driver 220 and data driver 230. Accordingly, the scan driver 220 sequentially applies scan signals to the scan lines SL, and the data driver 230 applies data signals to the emission pixels P. Also, the controller 250 generates and supplies a dummy data control signal to the dummy data driver 240, for controlling a time point when the dummy data signal is provided. Accordingly, the dummy data driver 240 may supply the data signal to a dummy data line DDL connected to dummy pixel DP during a repairing operation. The data signal is the same as the data signal applied to the repaired emission pixel P. Also, a first power voltage ELVDD, a second power voltage ELVSS, an emission control signal EM, an initialization voltage Vint, etc. may be provided to emission pixels P under the control of the controller 250.

Figure 9:
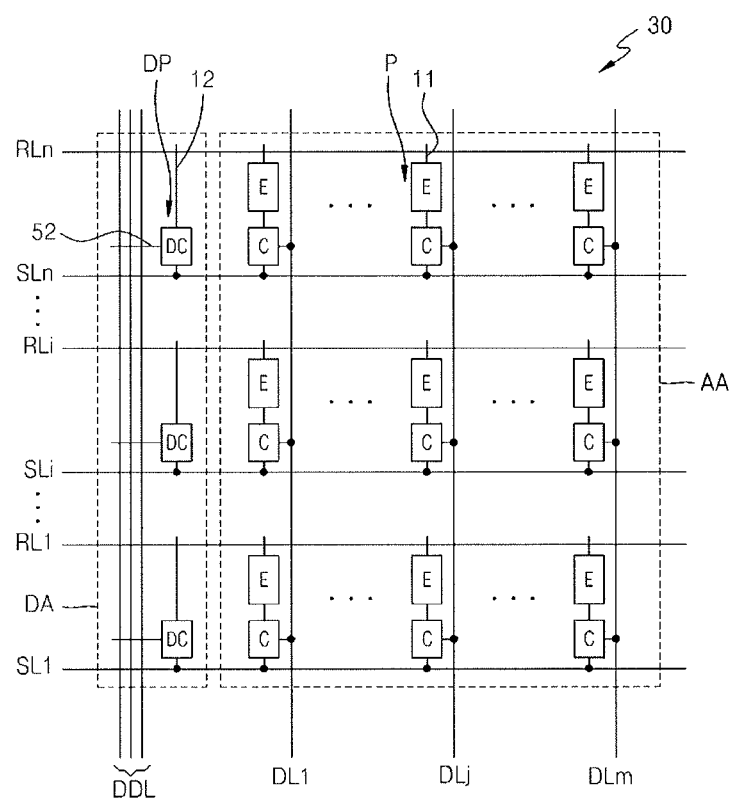
FIG. 9 illustrates an example of a display panel in FIG. 8.

FIG. 9 illustrates an example of a display panel in FIG. 8. Referring to FIG. 9, a display panel 30 may include active area AA displaying images by emitting light and dummy area DA adjacent the active area AA.

The active area AA includes a plurality of scan lines SL1 through SLn and a plurality of data lines DL1 through DLm. A plurality of emission pixels P are formed where the scan lines SL1 through SLn and data lines DL1 through DLm cross each other in a roughly matrix shape. Each of the emission pixels P includes an emission pixel circuit C and an emission device E receiving a driving current from the emission pixel circuit C to emit light. The emission pixel circuit C may include one or more TFTs and capacitors. The emission pixel P emits light of a predetermined color, for example, one of red, blue, green, or white. In other embodiments, light of another color may be emitted.

A plurality of repair lines RL1 through RLn extend parallel to and are spaced from scan lines SL1 through SLn. The emission device E in each emission pixel P is insulated from the repair line RL at the same row. Also, the emission device E may be electrically connected to a corresponding repair line RL when the emission pixel circuit C is defective and a repairing operation is performed.

For example, emission device E is electrically connected to a first connection member 11. The first connection member 11 may partially overlap a corresponding repair line RL with an insulating layer therebetween. The first connection member 11 may include one or more conductive layers. When a repairing operation is performed, a laser beam is irradiated to an overlapping region between the first connection member 11 and the repair line RL. Then, the insulating layer is damaged and the first connection member 11 and the repair line RL are shorted, thereby electrically connecting them together, i.e., emission device E is electrically connected to repair line RL.

The dummy area DA may be formed on at least one of left or right positions of active area AA. One or more dummy pixels DP may be formed in each row of pixels. In FIG. 9, dummy area DA is formed on the left side of active area AA, and one dummy pixel DP is formed in each pixel row.

The dummy pixels DP connected the scan lines SL1 through SLn are formed in the dummy area DA. One or more dummy data lines DDL are formed in the dummy area DA. The dummy data lines DDL are arranged in parallel with the data lines DL1 through DLm. The repair lines RL1 through RLn of active area AA and scan lines SL1 through SLn extend into dummy area DA. That is, dummy pixel DP and emission pixels P of the same row share the same scan line SL and repair line RL.

The dummy pixel DP does not include an emission device, but includes a dummy pixel circuit DC. The dummy pixel circuit DC may be the same as or different from the emission pixel circuit C. For example, the transistor and/or the capacitor of the emission pixel circuit C may be omitted and/or added in the dummy pixel circuit DC, or sizes and characteristics of the transistor and the capacitor in the dummy pixel circuit DC may be different from those of the emission pixel circuit C.

Each dummy pixel circuit DC is insulated from at least one corresponding dummy data line DDL, and may be electrically connected to a dummy data line DDL when a repairing operation is performed. For example, dummy pixel circuit DC may be electrically connected to a fifth connection member 52. The fifth connection member 52 may partially overlap at least one dummy data line DDL, with an insulating layer therebetween. The fifth connection member 52 may include one or more conductive layers similar to first connection member 11.

When the repairing operation is performed, a laser is irradiated on the overlapping region between fifth connection member 52 and dummy data line DDL. As a result, the insulating layer is damaged and the fifth connection member 52 and the dummy data line DDL are shorted to be electrically connected to each other. Accordingly, one dummy pixel DP may be electrically connected to one dummy data line DDL.

In addition, the dummy pixel circuit DC is insulated from repair line RL in the same row. The dummy pixel circuit DC may also be electrically connected to repair line RL when the repairing operation is performed. For example, dummy pixel circuit DC is electrically connected to second connection member 12, and second connection member 12 may partially overlap repair line RL, with an insulating layer therebetween.

The second connection member 12 may include one or more conductive layers formed of a conductive material. When a repairing operation is performed, a laser beam is irradiated onto the overlapping region between the second connection member 12 and the repair line RL. Then, the insulating layer is damaged and the second connection member 12 and the repair line RL are shorted. As a result, the second connection member and repair line RL are electrically connected to each other. Accordingly, the dummy pixel circuit DC is electrically connected to the repair line RL.

Figure 10:
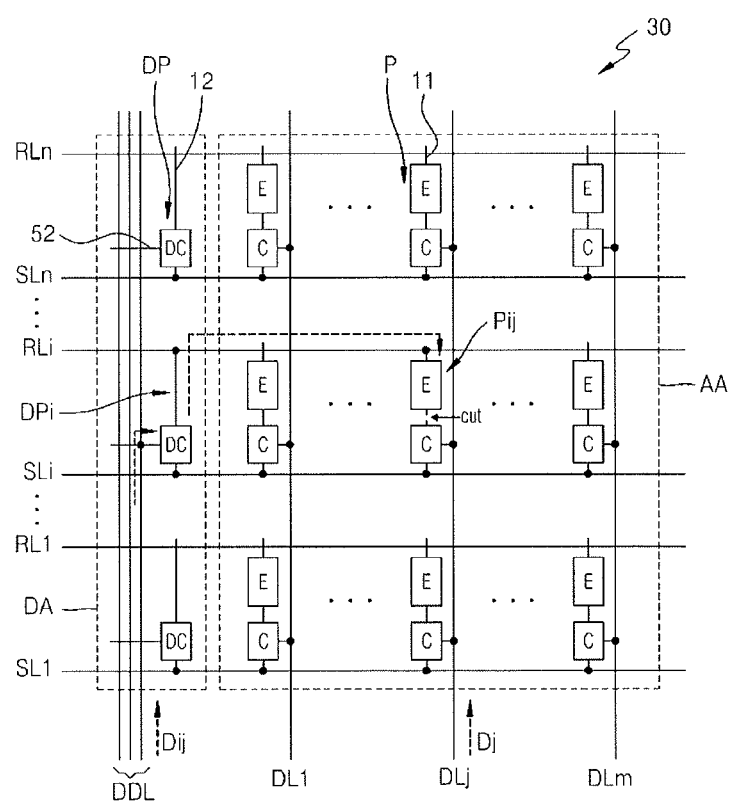
FIG. 10 illustrates a method of repairing a defective pixel using a repair line in the display panel of FIG. 9.
Figure 11:
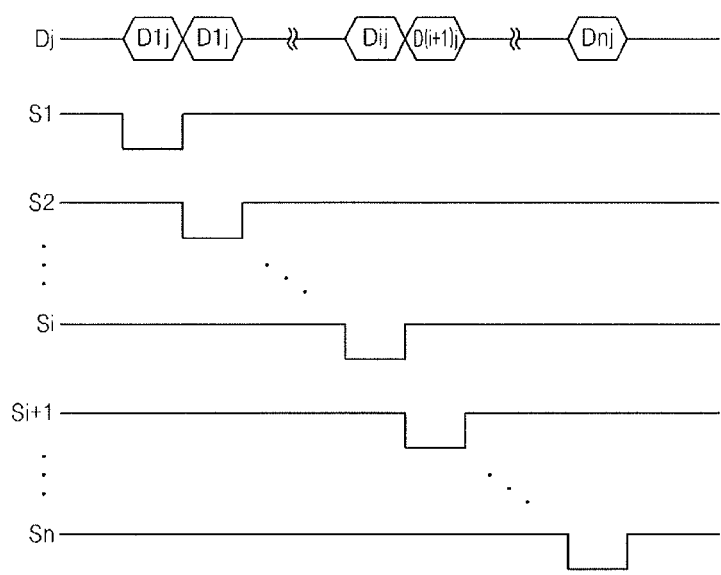
FIG. 11 illustrates scan and data signals supplied to the repaired panel of FIG. 10.

FIG. 10 illustrates an embodiment of a method for repairing a defective pixel using a repair line in the display panel of FIG. 9. FIG. 11 illustrates a timing diagram showing scan and data signals provided to the repaired display panel in FIG. 10. In this embodiment, a case is considered where an emission pixel Pij connected to an i-th scan line SLi and a j-th data line DLj is defective, from among the emission pixels P formed on the active area AA. More specifically, emission pixel circuit C of emission pixel Pij is considered to be defective.

Referring to FIG. 10, emission device E of defective emission pixel Pij is isolated from emission pixel circuit C. For example, a laser beam is irradiated on the connecting portion between emission device E and emission pixel circuit C to cut the connecting portion. Thus, emission device E of emission pixel Pij may be isolated from the emission pixel circuit C.

Next, emission device E of the emission pixel Pij and dummy pixel circuit DC of a dummy pixel DPi are connected to each other. To do this, the emission device E of the emission pixel Pij and the dummy pixel circuit DC of the dummy pixel DPi are connected to the repair line RLi at the same row. For example, the laser is irradiated onto the overlapping portion between the first connection member 11 connected to the emission device E of the emission pixel Pij and the repair line RLi. As a result, the first connection member 11 and emission device E are electrically connected to repair line RLi.

In addition, the laser is irradiated onto the overlapping region between the second connection member 12 connected to dummy pixel circuit DC of the dummy pixel DPi of the same row (i-th row) and the repair line RLi. As a result, the second connection member 12 and dummy pixel circuit DC are electrically connected to the repair line RLi.

In addition, the laser is irradiated onto the overlapping region between the fifth connection member 52 connected to dummy pixel circuit DC of the dummy pixel DPi and one dummy data line DDL. As a result, the fifth connection member 52 and the dummy data line DDL are electrically connected to each other.

Referring to FIG. 11, scan signals S1 through Sn are sequentially provided to first through n-th scan lines SL1 through SLn. In addition, data signals D1 through Dm are sequentially provided to first through m-th data lines DL1 through DLm in synchronization with the scan signals S1 through Sn. Also, a data signal Dij, that is the same as the data signal Dij applied to the repaired emission pixel Pij, is provided to the dummy data line DDL in synchronization with the scan signal Si provided to the i-th scan line SLi.

In FIG. 11, a data signal Dj provided to a j-th column is shown. Since the same scan signal Si is applied to the repaired emission pixel Pij and the dummy pixel DPi, the emission device E of the emission pixel Pij may receive a current corresponding to the data signal Dij from the dummy pixel circuit DC of the dummy pixel DPi, via the repair line RLi. Thus, light is emitted.

A width of the scan signal may be provided as one horizontal period (1H) in FIG. 11. In other embodiments, a width of a scan signal may be provided as two horizontal periods (2H), and widths of adjacent scan signals, for example, widths of first and second scan signal S1 and S2, may be provided to overlap by 1H or less. Accordingly, a lack of charges due to a resistive-capacitive (RC) delay of signal lines for a large-sized active area AA may be solved.

Figure 12:
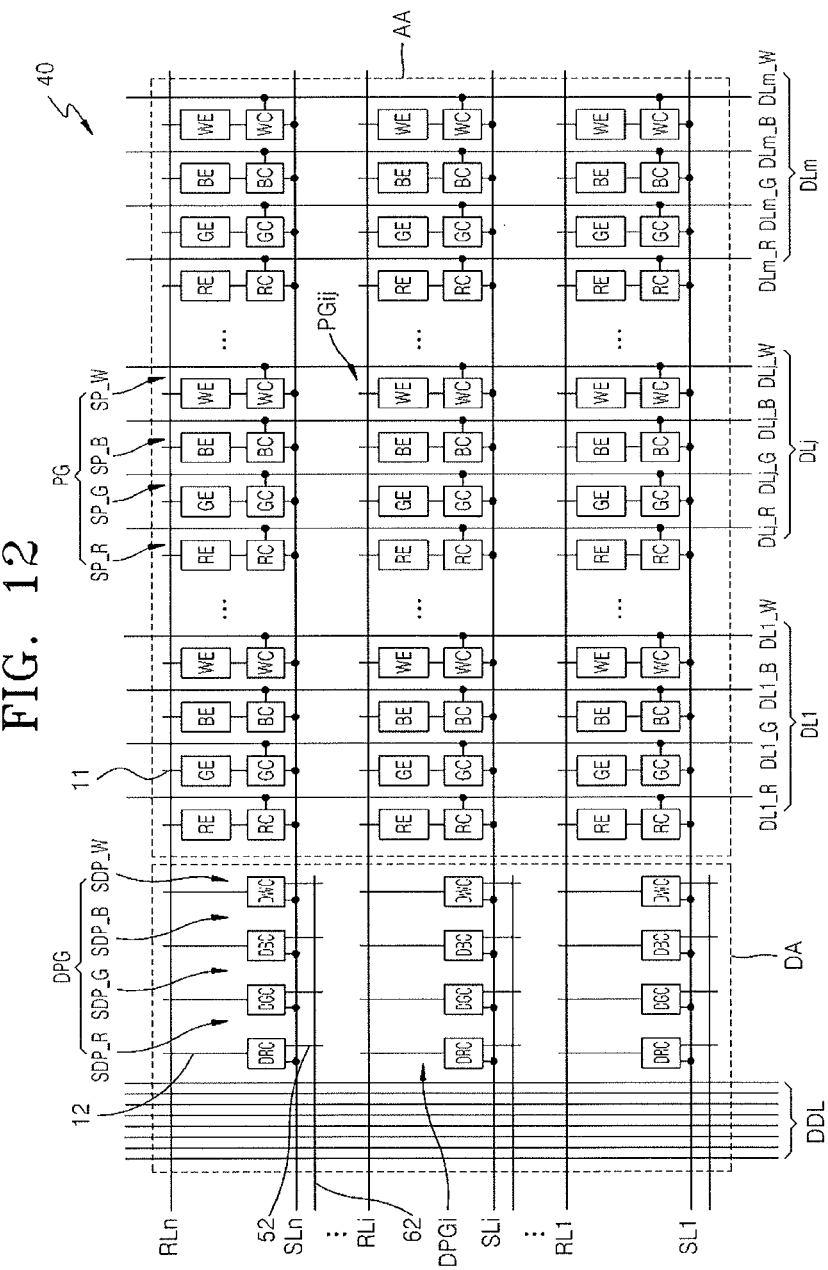
FIG. 12 illustrates another example of the display panel shown in FIG. 8.

FIG. 12 illustrates another example of the display panel shown in FIG. 8. Referring to FIG. 12, the display panel 40 includes active area AA for displaying images by emitting light and dummy area DA adjacent active area AA.

Active area AA includes a plurality of scan lines SL1 through SLn and a plurality of data lines DL1 through DLm. A plurality of unit emission pixels PG are formed where the scan lines SL1 through SLn and the data lines DL1 through DLm cross each other in roughly a matrix shape. Each of the unit emission pixels PG may include a plurality of sub-emission pixels SP.

For example, unit emission pixel PG may include a red sub-emission pixel SP_R, a green sub-emission pixel SP_G, a blue sub-emission pixel SP_B, and a white sub-emission pixel SP_W. The plurality of sub-emission pixels SP in the unit emission pixel PG may be connected to the same scan line SL, and may be connected respectively to data lines DL_R, DL_G, DL_B, and DL_W.

In one embodiment, the sub-emission pixels SP_R, SP_G, SP_B, and SP_W of the unit emission pixel PGij located at a point between the i-th row and the j-th column are connected to an i-th scan line SLi. These sub-emission pixels may also be connected respectively to data lines DLj_R, DLj_G, DLj_B, and DLj_W in the j-th column. The red sub-emission pixel SP_R, the green sub-emission pixel SP_G, the blue sub-emission pixel SP_B, and the white sub-emission pixel SP_W may respectively include emission pixel circuits RC, GC, BC, and WC. Emission devices RE, GE, BE, and WE emit light by receiving driving currents from the emission pixel circuits RC, GC, BC, and WC, respectively. Each of the emission pixel circuits RC, GC, BC, and WC may include one or more TFTs and capacitors.

A plurality of repair lines RL1 through RLn extend in parallel with and are spaced from the scan lines SL1 through SLn. The emission devices RE, GE, BE, and WE in the unit emission pixel PG are insulated from the repair line RL, and may be electrically connected to the repair line RL at the same row when a repairing operation is performed. For example, emission devices RE, GE, BE, and WE in unit emission pixel PG are electrically connected to first connection members 11. The first connection members 11 may partially overlap repair line RL, with insulating layers therebetween. The first connection member 11 may include one or more conductive layers.

When a repairing operation is performed, a laser is irradiated onto the overlapping region between the first connection member 11 and repair line RL. Then, the insulating layer is damaged and the first connection member 11 and repair line RL are shorted to electrically connect them together. Accordingly, the emission devices RE, GE, BE, and WE may be electrically connected to repair lines RL.

A plurality of unit dummy pixels DPG, connected the scan lines SL1 through SLn, are formed in dummy area DA. The unit dummy pixels DPG may be formed to the right or left, or both, of active area AA. One or more unit dummy pixels DPG may be formed in each row. In FIG. 12, dummy area DA is formed to the left of active area AA, and one unit dummy pixel DPG is formed in each of the rows.

The unit dummy pixel DPG may include a plurality of sub-dummy pixels SDP. For example, unit dummy pixel DPG may include a red sub-dummy pixel SDP_R, a green sub-dummy pixel SDP_G, a blue sub-dummy pixel SDP_B, and a white sub-dummy pixel SDP_W. The plurality of sub-dummy pixels SDP_R, SDP_G, SDP_B, and SDP_W in the unit dummy pixel DPG are connected to the same scan line SL. For example, sub-dummy pixels SDP_R, SDP_G, SDP_B, and SDP_W in the unit dummy pixel DPGi of the i-th row are connected to the i-th scan line SLi.

The plurality of sub-dummy pixels SDP_R, SDP_G, SDP_B, and SDP_W may not include emission devices, but rather may include dummy pixel circuits DRC, DGC, DBC, and DWC. Each of the dummy pixel circuits DRC, DGC, DBC, and DWC may include one or more TFTs and capacitors. The dummy pixel circuits DRC, DGC, DBC, and DWC may be the same as or different from the pixel circuit C. For example, the transistor and/or the capacitor of the pixel circuits RC, GC, BC, and WC may be omitted and/or added in the dummy pixel circuit DRC, DGC, DBC, or DWC. Also, sizes and characteristics of the transistor and/or capacitor in the dummy pixel circuit DRC, DGC, DBC, or DWC may be different from those of the emission pixel circuits RC, GC, BC, and WC.

The repair lines RL1 through RLn and scan lines SL1 through SLn of active area AA extend to dummy area DA. That is, unit dummy pixel DPG and unit emission pixel PG of the same row share the scan line SL and the repair line RL.

At least one dummy data line DDL is formed in the dummy area DA. The dummy pixel circuits DRC, DGC, DBC, and DWC of the unit dummy pixel DPG are insulated from the at least one dummy data line DDL. These dummy pixel circuits may also be electrically connected to the at least one dummy data line DDL when a repairing operation is performed.

For example, dummy pixel circuits DRC, DGC, DBC, and DWC of the unit dummy pixel DPG are electrically connected to the fifth connection member 52. The fifth connection member 52 may partially overlap a sixth connection member 62, with an insulating layer therebetween. The sixth connection member 62 may partially overlap the fifth connection member 52 connected to the dummy pixel circuits DRC, DGC, DBC, and DWC and the at least one dummy data line DDL, with insulating layers therebetween.

The sixth connection member 62 may include one or more conductive layers similar to the first connection member 11. When a repairing operation is performed, the laser is irradiated onto the overlapping region between the fifth connection member 52 and sixth connection member 62 and the overlapping region between the sixth connection member 62 and the dummy data line DDL. As a result, the insulating layers are damaged and the fifth connection member 52 and the sixth connection member 62 and the sixth connection member 62 and the dummy data line DDL are shorted and electrically connected together. Accordingly, one dummy pixel circuit DRC, DGC, DBC, or DWC may be electrically connected to one dummy data line DDL.

In addition, the unit dummy pixel DPG is insulated from the repair line RL. Then, the unit dummy pixel DPG and repair line RL may be electrically connected to the repair line RL when the repairing operation is performed. For example, the dummy pixel circuits DRC, DGC, DBC, and DWC of the unit dummy pixel DPG are electrically connected to the second connection member 12. The second connection member 12 may partially overlap repair line RL, with an insulating layer therebetween. The second connection member 12 may include one or more conductive layers.

When the repairing operation is performed, a laser is irradiated onto the overlapping region between the second connection member 12 and the repair line RL. Then, the insulating layer is damaged and the second connection member 12 and repair line RL are shorted to be electrically connected together. Accordingly, dummy pixel circuits DRC, DGC, DBC, and DWC may be electrically connected to repair line RL.

In FIG. 12, an example is illustrated where the unit pixel includes four sub-pixels emitting colors RGBW. In other embodiments, the unit pixel may include two or more sub-pixels emitting different colors, for example, three sub-pixels emitting the colors RGB.

Figure 13:
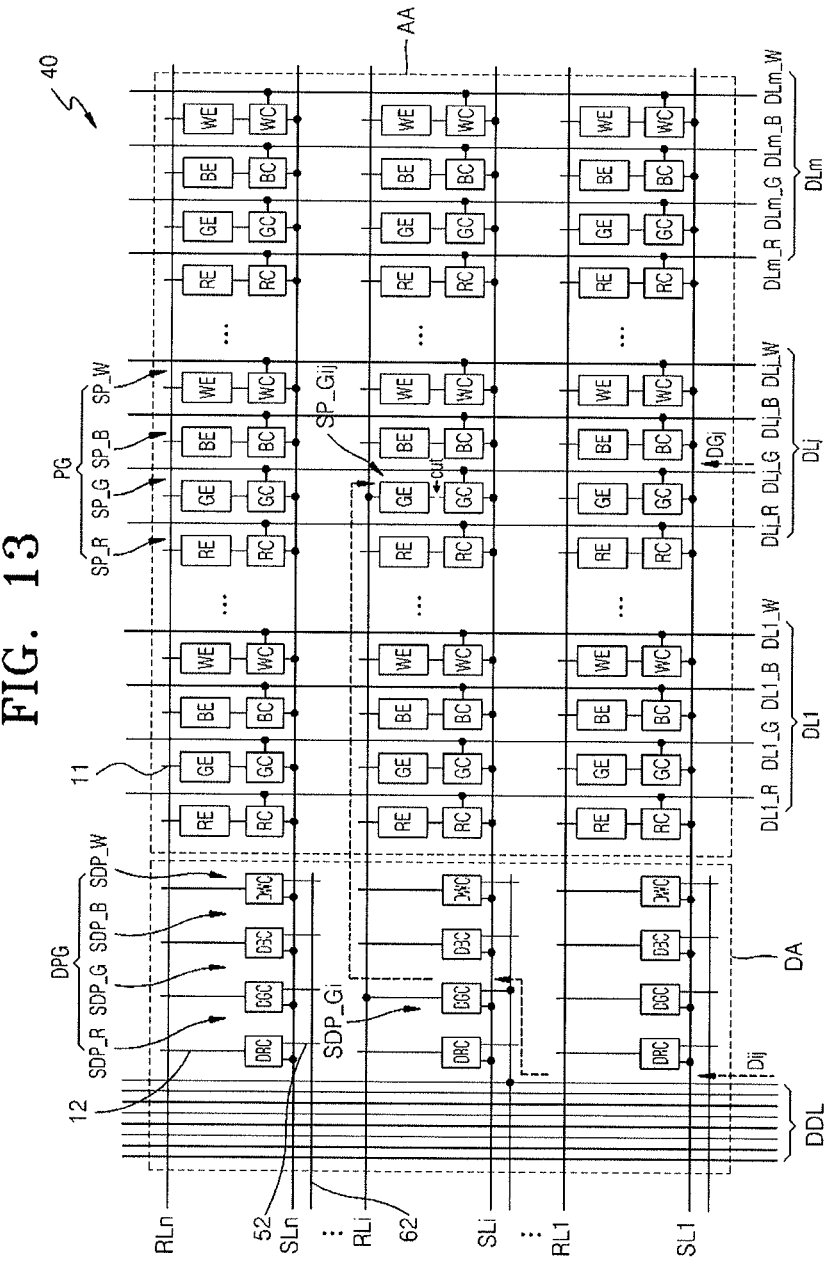
FIG. 13 illustrates a method of repairing a defective pixel using a repair line in the display panel of FIG. 12.
Figure 14:
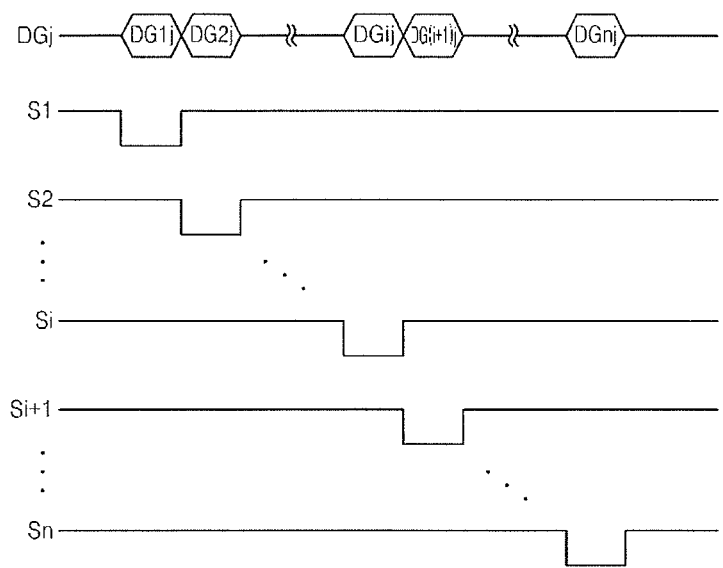
FIG. 14 illustrates scan and data signals supplied to the repaired panel of FIG. 13.

FIG. 13 illustrates a method for repairing a defective pixel using the repair line RL in display panel 40 of FIG. 12. FIG. 14 illustrates a timing diagram showing the scan and data signals provided to the repaired display panel as shown in FIG. 13. For illustrative purposes, a case is considered where a green sub-emission pixel SP_Gij connected to an i-th scan line SLi and a j-th data line DLj_G is defective, among the sub-emission pixels SP in active area AA. More specifically, the pixel circuit GC of the green sub-emission pixel SP_Gij is considered to be defective, and a repairing method using a green sub-dummy pixel SDP_Gi at the same row will now be described.

Referring to FIG. 13, emission device GE of green sub-emission pixel SP_Gij is defective and is isolated from the emission pixel circuit GC. For example, a laser is irradiated onto the connection region between the emission device GE and emission pixel circuit GC to cut the connection region. The emission device GE of the green sub-emission pixel SP_Gij is therefore isolated from emission pixel circuit GC.

Next, the emission device GE of green sub-emission pixel SP_Gij and dummy pixel circuit DGC of the green sub-dummy pixel SDP_Gj are electrically connected to each other. To do this, the emission device GE of the green sub-emission pixel SP_Gij and the dummy pixel circuit DGC of the green sub-dummy pixel SDP_Gj are connected to the same repair line RLi. For example, a laser is irradiated onto the overlapping region between the first connection member 11 connected to the emission device GE of the green sub-emission pixel SP_Gij and the repair line RLi. The first connection member 11 and repair line RLi are therefore electrically connected to each other.

In addition, a laser is irradiated onto the overlapping region between the second connection member 12 connected to the dummy pixel circuit DGC of the green sub-dummy pixel SDP_Gi and the repair line RLi. As a result, the second connection member 12 and the repair line RLi are electrically connected to each other.

In addition, the dummy pixel circuit DGC of the green sub-dummy pixel SDP_Gi is connected to the dummy data line DDL. For example, a laser is irradiated on the overlapping region between the fifth connection member 52 connected to the dummy pixel circuit DGC and the sixth connection member 62 to electrically connect the fifth connection member 52 and the sixth connection member 62 to each other. Then, the laser is irradiated onto the overlapping region between the sixth connection member 62 and the dummy data line DDL to electrically connect the sixth connection member 62 and the dummy data line DDL to each other.

Referring to FIG. 14, scan signals S1 through Sn are sequentially provided to first through n-th scan lines SL1 through SLn. In addition, data signals D1 through Dm are sequentially provided to first through m-th data lines DL1 through DLm in synchronization with the scan signals S1 through Sn. In the example of FIG. 14, a green data signal DGj is provided to a j-th column. In addition, the same scan signal Si is provided to the green sub-emission pixel SP_Gij and the green sub-dummy pixel SDP_Gi connected to the repair line RLi. In addition, a data signal DGij, that is the same as the data signal DGij provided to the green sub-pixel SP_Gij, is provided to the dummy data line DDL in synchronization with the scan signal Si. Accordingly, the data signal DGij is provided to the green sub-dummy pixel SDP_Gi. As a result, the emission device E of the green sub-emission pixel SP_Gij may receive the current corresponding to the data signal DGij, via the repair line RLi, at a predetermined timing to emit light.

In FIG. 14, a width of the scan signal may be provided as one horizontal period (1H). In other embodiments, a width of a scan signal may be provided as two horizontal periods (2H). Also widths of adjacent scan signals, for example, widths of the first and second scan signal S1 and S2, may be provided to overlap by 1H or less. Accordingly, a lack of charges due to a resistive-capacitive (RC) delay of signal lines according to a large-sized active area AA may be solved.

Figure 15:
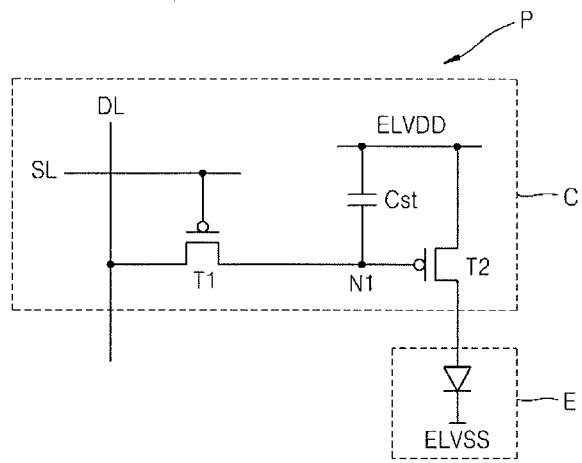
FIG. 15 illustrates an embodiment of an emission pixel.

FIG. 15 illustrates an embodiment of an emission pixel P which includes an emission pixel circuit C for supplying current to an emission device E. The emission device E may be, for example, an organic light emitting diode (OLED) which includes a first electrode, a second electrode facing the first electrode, and an emission layer between the first electrode and the second electrode. The first electrode and the second electrode may be an anode and cathode, respectively. The emission pixel circuit C may include two transistors T1 and T2 and one capacitor Cst.

A gate electrode of the first transistor T1 is connected to a scan line, a first electrode of the first transistor T1 is connected to a data line, and a second electrode of the first transistor T1 is connected to a first node N1.

A gate electrode of the second transistor T2 is connected to the first node N1, a first electrode of the second transistor T2 receives a first power voltage ELVDD from a first power source, and a second electrode of the second transistor T2 is connected to a pixel electrode of the emission device E.

A first electrode of the capacitor Cst is connected to the first node N1. A second electrode of the capacitor Cst receives the first power voltage ELVDD from the first power source.

The first transistor T1 transfers a data signal D provided from the data line DL to the first electrode of the capacitor Cst when the scan signal S is provided from the scan line SL. Accordingly, a voltage corresponding to the data signal D is charged in the capacitor Cst. A driving current corresponding to the voltage charged in the capacitor Cst is transferred to the emission device E, via the second transistor T2, so that the emission device E emits light.

FIG. 15 illustrates a 2Tr-1Cap structure, in which two transistors and one capacitor are formed in one pixel. In other embodiments, each pixel may have a different number of transistors and/or capacitors, e.g., each pixel may include two or more TFTs and one or more capacitors. Additional wiring may be formed or existing wiring may be omitted to form additional pixel circuit structures.

Figure 16:
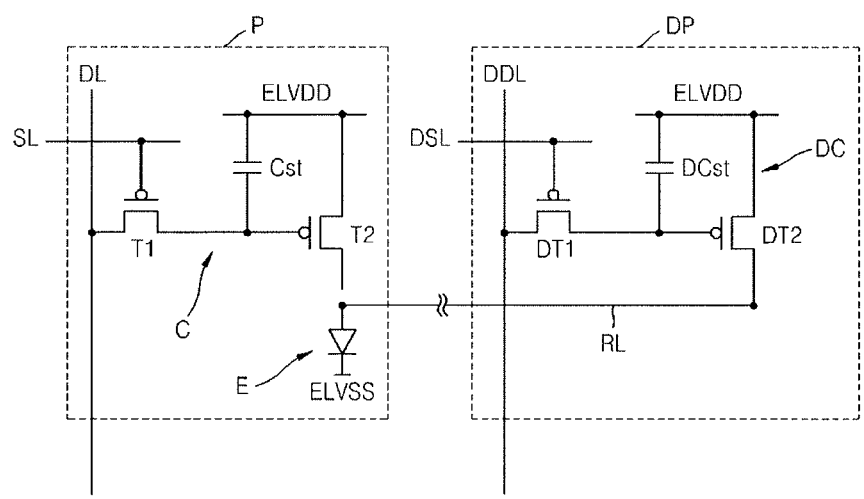
FIG. 16 illustrates a method of repairing an emission pixel using a dummy pixel.

FIG. 16 illustrates an embodiment of a method for repairing an emission pixel using a dummy pixel. Referring to FIG. 16, emission pixel P includes an emission pixel circuit C for supplying current to emission device E. The emission pixel P of this embodiment may correspond to the emission pixel in FIG. 15.

The dummy pixel DP may be disposed at the same column or the same row as the emission pixel P, and includes a dummy pixel circuit DC. The dummy pixel circuit DC may be the same as or different from the emission pixel circuit C.

The dummy pixel circuit DC may include a first dummy transistor DT1 connected to a dummy scan line DSL and a dummy data line DDL, a second dummy transistor DT2 connected between the first power voltage ELVDD and the first dummy transistor DT1, and a dummy capacitor DCst connected between the first power voltage ELVDD and the first dummy transistor DT1. In FIG. 16, an exemplary dummy pixel circuit DC is shown. Thus, the dummy pixel circuit DC may be formed to have various structures. For example, one or more TFTs and/or capacitors may be formed, or only one 0capacitor may be included.

The dummy scan line DSL may be a scan line that is the same as or different from the scan line SL disposed in the emission pixel circuit C. The dummy data line DDL may be a data line that is the same as or different from the data line DL disposed in the emission pixel circuit C.

If emission pixel circuit C is defective, emission pixel circuit C and emission device E are isolated from each other. In addition, the emission device E may be connected to the dummy pixel circuit DC at the same column or the same row via the repair line RL. As such, emission device E of emission pixel P may receive the driving current from the dummy pixel circuit DC to emit the intended light. The isolation and connection between the devices may be performed, for example, using a laser repair method as previously described.

In accordance with one or more embodiments a bright spot or a dark spot emitted from a pixel that includes a defective pixel circuit may be repaired, and light may be emitted without loss of brightness. Also, in accordance with one or more embodiments, a defective emission pixel is repaired using a dummy pixel DP, and thus the defective emission pixel P may emit light at a right timing. Also, according to one or more embodiments, a defective pixel of a display apparatus that sequentially emits light may be repaired easily by using a dummy pixel. The display apparatus may be therefore driven without changing a bright spot into a dark spot.

The aforementioned embodiments are described, for illustrative purposes, as being applied to an organic light emitting diode (OLED) display apparatus. However, in alternative embodiments, the use of a repair line as described above may be applied to other types of light emitting display apparatuses.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A light emitting display apparatus comprising:
   a plurality of data lines extended along a first direction in an active area;
   a plurality of scan lines extended along a second direction different from the first direction in the active area;
   a plurality of emission pixels in the active area, each emission pixel being connected to a corresponding scan line of the plurality of scan lines and a corresponding data line of the plurality of data lines;
   a plurality of dummy pixels arranged along the first direction or the second direction in a dummy area around the active area;
   a plurality of repair lines extended in the active area and the dummy area, the repair lines extended perpendicular to the arrangement direction of the dummy pixels, wherein each emission pixel includes an emission device and an emission pixel circuit connected to the emission device, wherein each dummy pixel includes a dummy pixel circuit, and wherein one of the repair lines is connected to the emission device of one of the emission pixels and the dummy pixel circuit of one of the dummy pixels; and
   a plurality of dummy data lines in the dummy area and parallel to the data lines of the active area, wherein:
   at least one dummy pixel is at each row,
   each repair line is extended parallel to a corresponding one of the scan lines, and
   each dummy pixel is connected to a corresponding one of the scan lines extended to the dummy area and connectable to one of the plurality of dummy data lines.

2. The light emitting display apparatus as claimed in claim 1, wherein the emission pixel circuit includes:
   a first transistor to transfer a data signal in response to a scan signal from a corresponding one of the scan lines;
   a capacitor to store a voltage corresponding to the data signal from a corresponding one of the data lines; and
   a second transistor to transfer a driving current corresponding to the voltage stored in the capacitor to the emission device.

3. The light emitting display apparatus as claimed in claim 1, wherein the dummy pixel circuit and the emission pixel circuit have substantially a same structure.

4. The light emitting display apparatus as claimed in claim 1, wherein:
   each emission pixel includes a plurality of sub-emission pixels,
   each sub-emission pixel comprises an emission device and an emission pixel circuit connected to the emission device,
   each dummy pixel includes a plurality of sub-dummy pixels,
   each sub-dummy pixel includes a dummy pixel circuit, and the one of the repair lines connects the emission device of one of the plurality of sub-emission pixels to the dummy pixel circuit of one of the plurality of sub-dummy pixels.

5. The light emitting display apparatus as claimed in claim 1, wherein the dummy area is at least one of an adjacent area of a first row of the active area or adjacent area of a last row of the active area.

6. The light emitting display apparatus as claimed in claim 1, wherein:
the one of the repair lines, the one of the emission pixels and the one of the dummy pixels are in a same row, and
the one of the dummy pixels is connected to one of the dummy data lines.

7. The light emitting display apparatus as claimed in claim 6, wherein
each emission pixel includes a plurality of sub-emission pixels,
each sub-emission pixel comprises an emission device and an emission pixel circuit connected to the emission device,
each dummy pixel includes a plurality of sub-dummy pixels, each dummy pixel includes a dummy pixel circuit, and
the one of the repair lines connects the emission device of one of the sub-emission pixels and the dummy pixel circuit of a corresponding one of the sub-dummy pixels in the same row.

8. The light emitting display apparatus as claimed in claim 6, wherein a data signal applied to the one of the dummy pixels connected to one of the repair lines using a corresponding one of the dummy data lines is the same as a data signal applied to the one of the emission pixels connected to the one of the repair lines, and the data signal is simultaneously provided to the one of the emission pixels and the one of the dummy pixels which are connected to the one of the repair lines.

9. The light emitting display apparatus as claimed in claim 1, wherein the dummy area is at least one of adjacent area of a first column of the active area or adjacent area of a last column of the active area.

10. A method of driving a light emitting display apparatus, including a plurality of dummy pixels in a dummy area around an active area and a plurality of repair lines in the active area and the dummy area, one of the repair lines connecting an emission device of one of a plurality of emission pixels and to a dummy pixel circuit of one of the dummy pixels, the method comprising:
applying scan signals and data signals in synchronization with the scan signals to the plurality of emission pixels; and
applying a first data signal to the one of a plurality of dummy pixels connected to one of a plurality of repair lines when second data signal is provided to the one of the emission pixels connected to one of the repair lines, wherein the first data signal and the second data signal are the same data signal, wherein applying the first data signal to the one of the dummy pixels includes:
applying the scan signal to the one of the dummy pixels connected to the one of the repair lines when the scan signal is applied to the emission pixels connected to a same scan line, and
applying the first data signal to the one of the dummy pixels in synchronization with the scan signal; and
emitting light from the plurality of emission pixels according to driving currents corresponding to respective ones of the data signals, wherein the dummy pixels do not emit light while the emission pixels emit light.

11. A light emitting display apparatus, comprising:
a plurality of data lines extended along a first direction in an active area;
a plurality of scan lines extended along a second direction different from the first direction in the active area;
a plurality of emission pixels in the active area, each emission pixel being connected to a corresponding scan line of the plurality of scan lines and a corresponding data line of the plurality of data lines;
a plurality of dummy pixels arranged along the first direction or the second direction in a dummy area around the active area;
a plurality of dummy scan lines in the dummy area, wherein:
at least one dummy pixel is at each column,
each repair line is extended parallel to a corresponding one of the data lines, and
each dummy pixel is connected to a corresponding one of the plurality of dummy scan lines in the dummy area and a corresponding one of the data lines extended to the dummy area; and
a plurality of repair lines extended in the active area and the dummy area, the repair lines extended perpendicular to the arrangement direction of the dummy pixels, wherein
each emission pixel includes an emission device and an emission pixel circuit connected to the emission device,
each dummy pixel includes a dummy pixel circuit, and wherein one of the repair lines is connected to the emission device of one of the emission pixels and the dummy pixel circuit of one of the dummy pixels,
the one of the repair lines, connected to the one of the emission pixels and the one of the dummy pixels are in a same column, and
a dummy scan signal is provided to the one of the dummy pixels connected to the one of the repair lines using a corresponding one of the dummy scan lines, when a scan signal is provided to the one of the emission pixels connected to the one of the repair lines using a corresponding one of the scan lines, such that a data signal is simultaneously provided to the one of the emission pixels and the one of the dummy pixels which are connected to the one of the repair lines.

* * * * *